United States Patent
Hamilton

[15] 3,677,595
[45] July 18, 1972

[54] AUTOMOBILE BUMPER

[72] Inventor: Douglas L. P. Hamilton, 8110 N. Beach Drive, Milwaukee, Wis. 53217

[22] Filed: June 30, 1970

[21] Appl. No.: 51,176

[52] U.S. Cl. .................... 293/73, 293/5, 293/9, 293/24, 303/13
[51] Int. Cl. .................................................. B60r 19/04
[58] Field of Search .......... 293/5, 9, 24, 73; 280/150 B; 303/7, 13, 20; 338/108; 200/86.5, 61.89

[56] References Cited

UNITED STATES PATENTS

| 3,134,619 | 5/1964 | Harrison | 293/9 |
| 2,873,994 | 2/1959 | Omps | 293/86 |
| 3,452,834 | 7/1969 | Gaut | 180/82 |
| 3,355,208 | 11/1967 | Brock | 293/9 |
| 3,346,292 | 10/1967 | Lundman | 293/9 |
| 3,203,724 | 8/1965 | Brunt | 293/89 |
| 2,056,942 | 10/1936 | Krueger | 188/106 P |
| 3,135,358 | 6/1964 | Greentree | 188/3 |

*Primary Examiner*—James B. Marbert
*Assistant Examiner*—Robert Saifer
*Attorney*—Ira Milton Jones

[57] ABSTRACT

The modern ornamental automobile bumper which is notoriously ineffective to withstand the impact of even a low speed collision is equipped with a sturdy spring steel impact receiving bar that is projected from a retracted position unobstrusively seated in a recess in the bumper to an operative position outwardly of the bumper as a consequence of the sudden forceful depression of the brake pedal by a driver attempting to avoid a collision.

4 Claims, 5 Drawing Figures

Patented July 18, 1972 3,677,595

Inventor
Douglas L.P. Hamilton
By Hamilton Jones
Attorney

Inventor
Douglas L.P. Hamilton

AUTOMOBILE BUMPER

This invention relates to automobile bumpers.

It is well known that the ornamental so-called bumpers on modern automobiles are notoriously incapable of withstanding impact. Being made of a soft drawing steel, these modern bumpers are bent or broken by the impact of even a minor collision, and invariably must be replaced. Needless to say the cost of such replacement is not an inconsequential matter since the bumpers of even relatively low priced automobiles are quite expensive.

But more serious than the cost of replacing a bumper is the damage done to other parts of the automobile as a result of the inability of the bumper to withstand and absorb the shock of a collision impact.

In recognition of the deficiencies of the ornamental so-called bumpers of modern automobiles, this invention has as its purpose and object the provision of an impact receiving and cushioning structure or bar that is automatically projected to an operative position several inches outwardly of the ornamental bumper as a consequence of sudden forceful application of the brakes in an emergency.

It is also an object of this invention to so mount the impact receiving bar that except when projected to its operative position, it is unobstrusively seated in a pocket or recess in the ornamental bumper. It is realized that this feature is not new per se, being shown, for instance in the U.S. Pat. No. 3,134,619 issued May 26, 1964 to LeVert Harrison, Jr. That patent illustrates an extensible member arranged to be moved from a retracted position seated in a recess in the automobile bumper, but it is in nowise concerned with the purposes of the present invention, being instead directed to the preservation or protection of adequate space ahead of and behind a parked car.

Other patents directed to the same concept are Brock U.S. Pat. No. 3,355,208, Tozier U.S. Pat. No. 2,274,440 and Cavanaugh U.S. Pat. No. 2,191,368.

A further object of this invention is to utilize the controlled release of hydraulic pressure by which the impact receiving bar is projected to its operative position to cushion the shock of a collision.

Still another object of the invention is to provide a brake pedal equipped with an electric switch to be actuated by foot-applied pressure on the pedal, but only such pressure as is exerted in an emergency condition, so that during ordinary application of the brakes the switch is not actuated.

With these observations and objectives in mind, the manner in which the invention achieves its purpose will be appreciated from the following description and the accompanying drawings, which exemplify the invention, it being understood that such changes in the specific apparatus disclosed herein may be made as come within the scope of the appended claims.

The accompanying drawings illustrate one complete example of the embodiment of the invention constructed according to the best mode so far devised for the practical application of the principles thereof, and in which.

Figure 1:
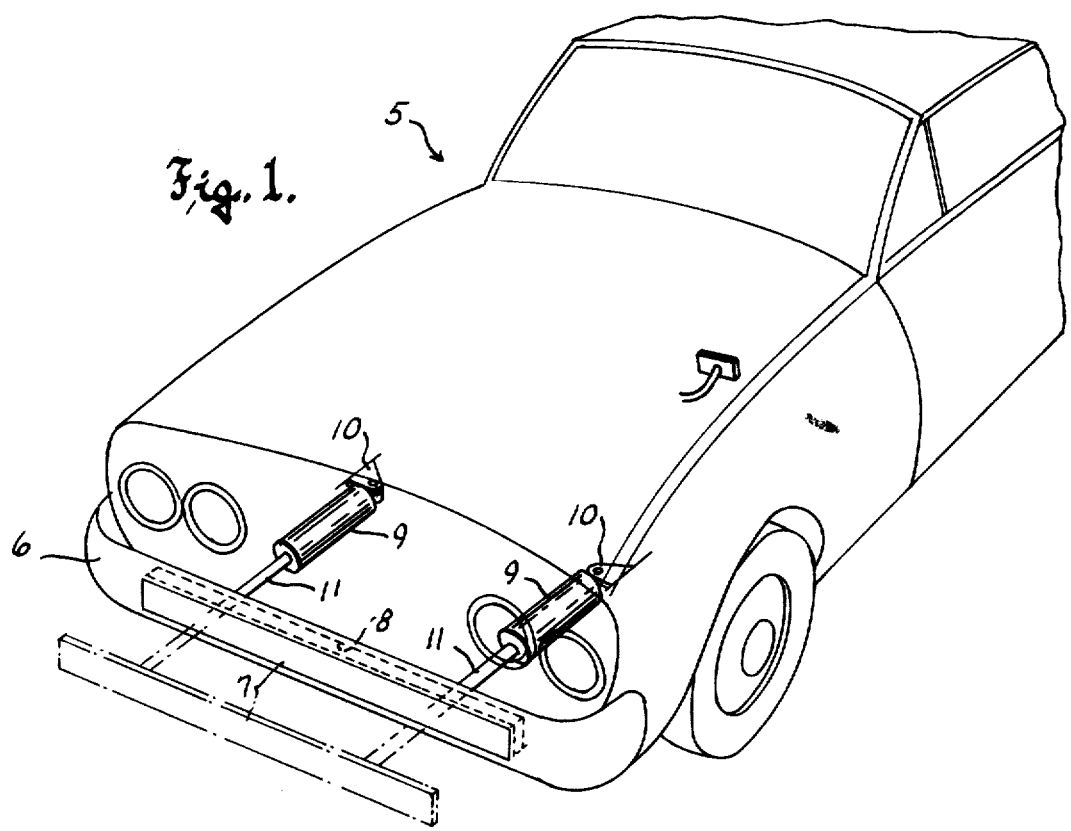
FIG. 1 is a perspective view, more or less in phantom, of the front end portion of an automobile equipped with the improved bumper of this invention.

Referring now more particularly to the accompanying drawings, the numeral 5 designates a conventional modern automobile which, as is customary, is equipped with front and rear ornamental bumpers 6, only the front bumper being illustrated. Although these bumpers are intended to provide protection for the body of the automobile against the hazards of front and rear end collisions, they seldom succeed in doing so. The reason for their ineffectiveness no doubt is found in the fact that the need to satisfy appearance requirements necessitated that the bumpers be made of relatively soft drawing quality steel. It is therefore not inappropriate to characterize these modern wrap-around bumpers as "so-called" or "p-suedo" bumpers.

To make these bumpers more effective, a sturdy impact receiving bar 7 is mounted therein to be projected, when needed, to an operative position several inches—on the order of 6—outwardly of the bumper. The impact receiving bars are formed of a good quality high carbon spring steel. Each bar extends for the major length of the bumper with which it is associated, and in its retracted position is seated in an elongated pocket or recess 8 in the bumper.

A pair of hydraulic cylinders 9 connects the impact receiving bar with the frame of the automobile as at 10 and provides means for projecting and retracting the bar. The rods 11 which project from the ends of the cylinders and of course are connected with the pistons in the cylinders, have their ends attached to the bar as at 12. Any suitable bearing means as for instances slots 13 in the bumper inwardly of its pocket or recess 8, slidably supports the rods 11 and in so doing mounts the impact receiving bar for movement from one position to the other.

Figure 2:
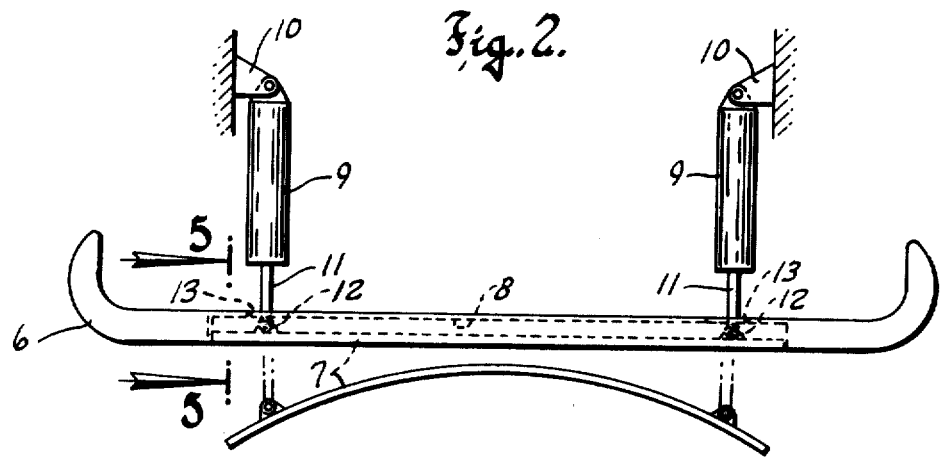
FIG. 2 is a plan view of the bumper assembly per se.

As shown in an exaggerated manner in FIG. 2 an impact upon the bar, of course when it is in its projected operative position, will result in the connections 12 being drawn toward one another. To accommodate such displacement the connections 12 and also the connections 10 between the cylinders and the frame of the automobile provide for relative pivotal motion about vertical axes, and for the same purpose, the bearing slots 13 are elongated.

Figure 4:
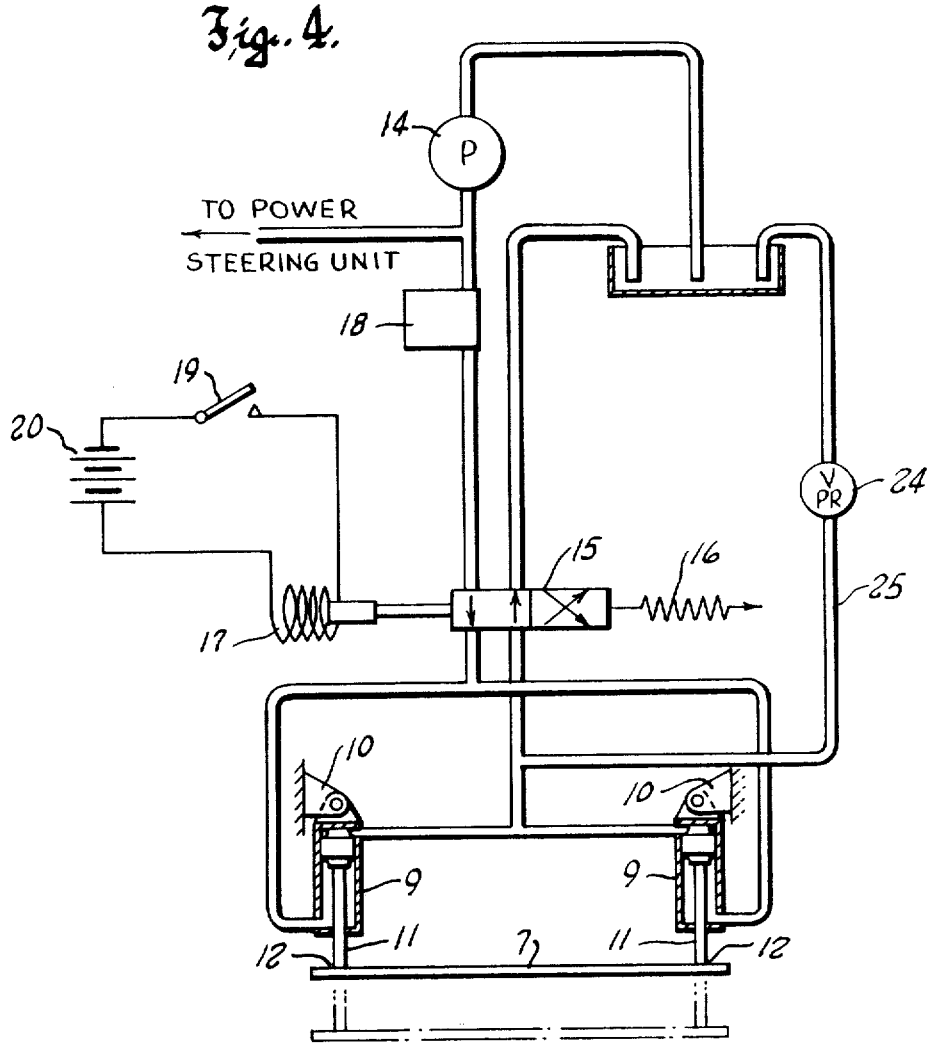
FIG. 4 is a diagram of the electrical and hydraulic control system of this invention.
Figure 5:
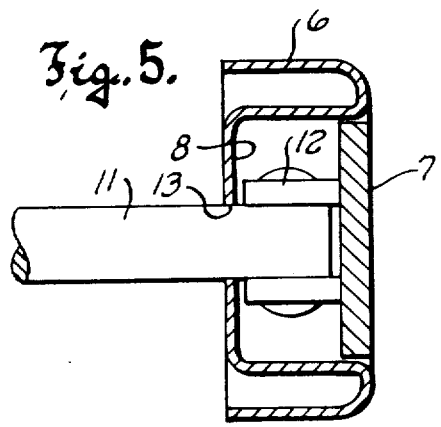
FIG. 5 is a cross sectional view through the bumper taken on the line 5—5 in FIG. 3.

As best illustrated in FIG. 4, the hydraulic cylinders 9 are of the two way type and hence can retract the impact receiving bar as well as project it to its operative position. The fluid pressure for operating the cylinders may be derived from the power steering system of the automobile or from any other suitable source. In FIG. 4, it is the pump 14 of the power steering system of the automobile which provides the pressure fluid, and the hydraulic cylinders 9 are connected with that pressure source through a control valve 15. The valve 15 is a two-position valve biased to one position, as by a spring indicated at 16, and movable to its other position by energization of a solenoid 17. In its first position to which it is biased, and which is its normal position, the valve so connects the cylinders with the fluid pressure source that the cylinders hold the impact receiving bar in its retracted position. The lines or ducts by which these connections are effected are readily traceable in the diagram.

Upon energization of the solenoid 17 and the consequent shift in position of the control valve, the connection to the hydraulic cylinders are reversed and, as a result, the bar 7 is projected to its operative position. Although the ordinary power steering system has sufficient capacity and develops high enough pressure to rapidly project the bar to its operative position the instant the control valve is shifted, a pressure accumulator 18 can be incorporated in the line leading from the pump to assure the desired rapid response.

Figure 3:
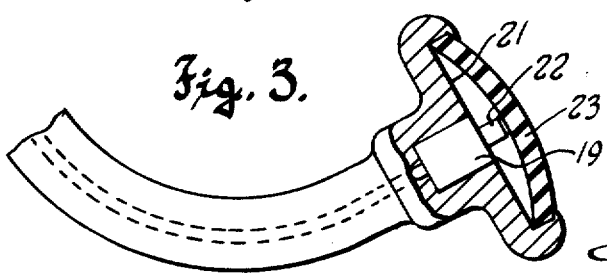
FIG. 3 is a detail view of the brake pedal by which projection of the impact receiving bar to its operative position is initiated and for which purpose the pedal is equipped with an electric switch and a resiliently yieldable motion imparting connection through which switch actuation is effected.

Energization of the solenoid is effected by closure of an electric switch 19 connected between the solenoid and a source of electric current, indicated in the diagram as a battery 20. The switch is normally open and is closed by sudden forcefully applied pressure on the brake pedal. To that end, the switch is seated in a pocket 21 in the brake pedal (see FIG. 3) with its actuator 22 projecting therefrom and in contact with a resiliently yieldable pad 23 that provides the outer pressure receiving face of the pedal. The pad is bowed outwardly to provide space for the switch actuator and for depression of the pad.

It is important that the pad 23, which is formed of rubber or rubber-like material, should have a durometer sufficiently stiff to unyieldingly resist and withstand being deformed and flattened during ordinary application of the brakes but not sufficient to resist the sudden pressure which is forcefully applied to the brake pedal in an emergency. Hence the desired projection of the impact receiving bar to its operative position occurs only during such an emergency.

To enable the bar 7 to yield upon impact and thereby cushion the resulting shock upon the automobile, a pressure relief valve 24 is provided in a line 25 which connects the head end of the hydraulic cylinders with the tank of the hydraulic system and is therefore in the connection between the pressure source and the hydraulic cylinders which obtains when the bar is in its operative position. Obviously this pressure relief valve must be set to remain closed during projection of the bar 7 to its operative position, but must open in response to the increased pressure in the cylinders resulting from the impact of a collision.

Although in the drawings only the front end of the automobile is illustrated, it will be understood that the rear bumper also can be equipped with an impact receiving bar and operatively connected with the system to be actuated concomitantly with the projection of the bar associated with the front bumper.

Those skilled in the art will appreciate that the invention can be embodied in forms other than as herein disclosed for purposes of illustration.

The invention is defined by the following claims:

1. In an automotive vehicle equipped with brakes that are activated by depression of a brake pedal, a source of pressure fluid, and an ornamental bumper, the improvement by which the ornamental bumper as well as the vehicle is protected from damage in the event of collision, and which comprises the combination of:
    A. a movable impact receiving bar normally occupying a retracted position seated in an elongated pocket in the ornamental bumper but projectable from said pocket to an impact receiving position outwardly of the ornamental bumper,
    said impact receiving bar having a capability considerably greater than that of the ornamental bumper to withstand impact;
    B. a hydraulic cylinder connected between each end portion of the impact receiving bar and the adjacent portion of the vehicle frame, which when activated by the application of fluid pressure thereto projects the impact receiving bar to its impact receiving position; and
    C. means for connecting said hydraulic cylinders with the fluid pressure source, said means comprising
        1. a solenoid actuated control valve,
        2. an electric switch on the brake which upon closure energizes the solenoid of the control valve, and
        3. switch actuating means mounted on the brake pedal and operable to close the switch in response to sudden forcefully applied pressure upon the brake pedal, while leaving the switch unaffected by the application of normal brake applying pressure upon the brake pedal.

2. In an automotive vehicle, the improvement set forth in claim 1, wherein
    said switch actuating means comprises a depressible actuator, and resiliently yieldable motion imparting means on the brake pedal and through which foot-applied pressure is imparted to the depressible actuator,
    said resiliently yieldable motion imparting means being capable of unyieldingly withstanding ordinary brake applying pressure but being incapable of withstanding pressure characteristic of an effort to avoid a collision.

3. In an automotive vehicle, the improvement set forth in claim 1, wherein said hydraulic cylinders are of the double acting type,
    wherein said control valve has two operative positions, in one of which it so connects the cylinders with the fluid pressure source as to hold the impact receiving bar in its retracted position seated in the pocket in the ornamental bumper, and in the other of which it reverses the connections between the cylinder and the fluid pressure source to project the bar to its operative impact receiving position.

4. In an automotive vehicle, the improvement set forth in claim 3, further characterized by the inclusion of a pressure relief valve in the connection between the cylinders and the fluid pressure source which exists when the impact receiving bar is in its projected operative position, said pressure relief valve being set to open in response to pressure in excess of that needed to project the bar to its operative position.

* * * * *